Patented Dec. 20, 1949

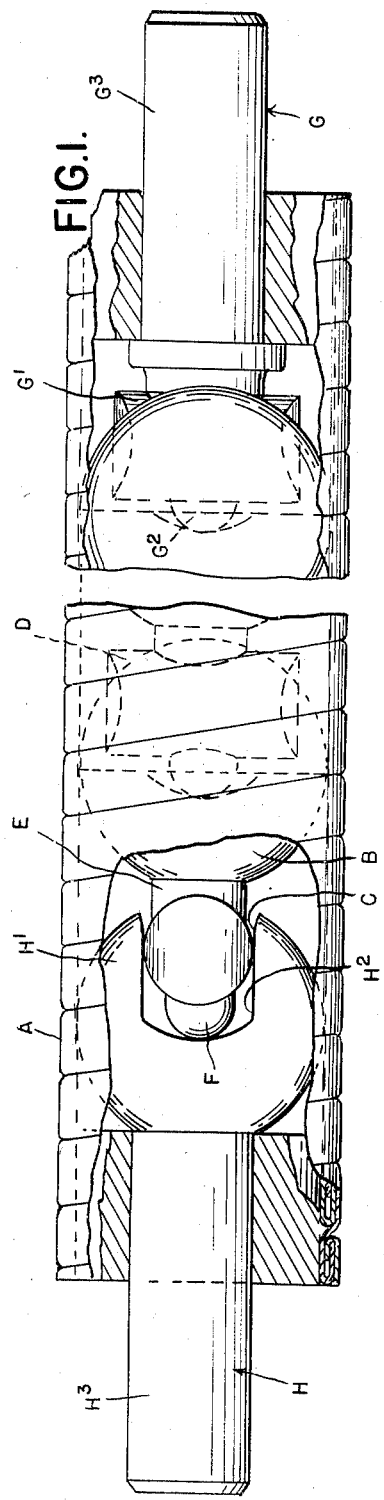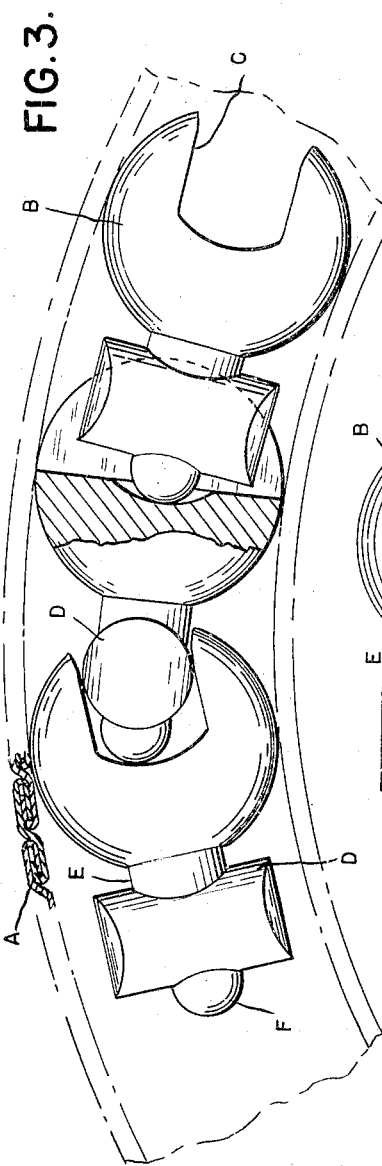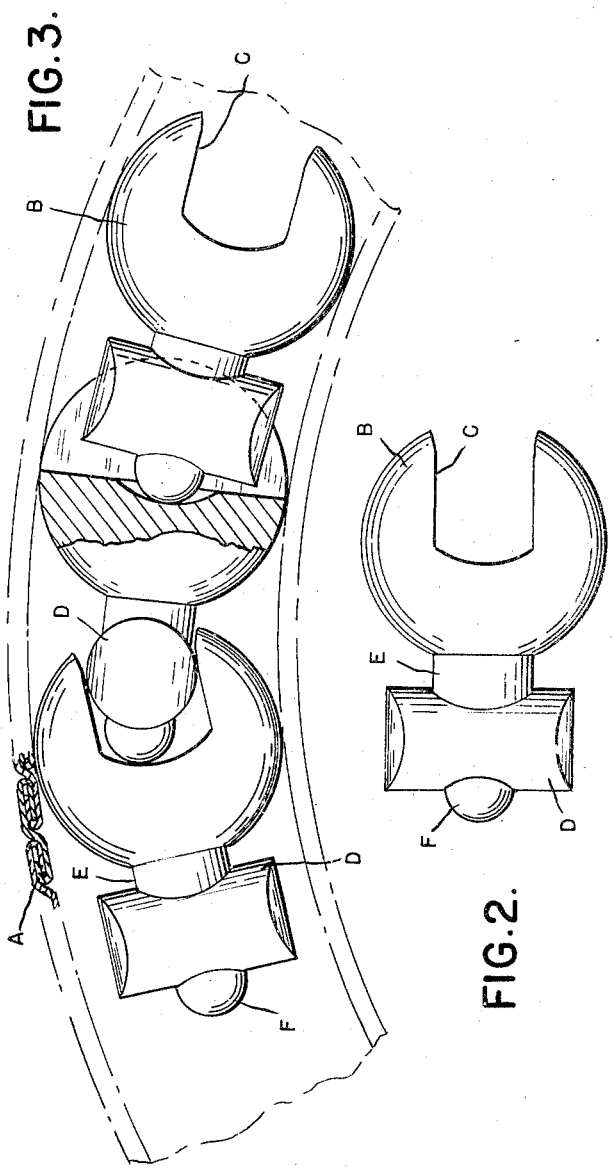
INVENTOR.
FREDERICK B. FITCH

2,491,653

UNITED STATES PATENT OFFICE 2,491,653

FLEXIBLE SHAFT

Frederick B. Fitch, Detroit, Mich., assignor to Morris Farm Machinery Company, Detroit, Mich., a corporation of Michigan Application September 9, 1946, Serial No. 695,748

9 Claims. (Cl. 64—2)

The invention relates to flexible shafts and it is the primary object of the invention to obtain a construction which is adapted for connecting the power take-off of a tractor with a trailer implement to drive the mechanism thereof. To this end the invention consists in the construction as hereinafter set forth.

In the drawings:

Fig. 1 is an elevation partly in section of my improved flexible shaft;

Fig. 2 is an elevation of one of the torque transmitting units;

Fig. 3 is a longitudinal section showing the shaft bent into an arcuate curve;

In general construction my improved flexible shaft includes as an element thereof a flexible tubing A of that type in which adjacent annular sections are so coupled to each other as to be capable of a limited amount of independent axial movement. Thus, the tube may be bent into an arcuate form while retaining its rigidity as to radial stresses. Within this tubing there is arranged a series of torque transmitting elements of the following construction. B is a spherical member having a slot C extending therein slightly more than one-half the diameter of the sphere. On the diametrically opposite side of the member B is a transversely extending trunnion portion D arranged in a plane which is perpendicular to the plane of the slot C. The trunnion D is of a diameter corresponding to the width of the slot C and is connected to the member B by a neck portion E which is of slightly smaller diameter than that of the trunnion. In axial alignment with this neck portion and on the outer side of the trunnion is a projecting knob F. The construction is such that a series of these members may be formed with a trunnion of one engaging the slot of the next adjacent member and with the knob F contacting with the bottom of said slot. The whole series is placed within the tubing A and at the opposite ends of the series are members G and H, the former having a trunnion member G' and knob G² connected to a cylindrical shank G³ and the latter having a spherical portion H' with a slot H² therein and a cylindrical shank portion H³.

With the construction as described one of the members G and H may be attached to the power take-off of the tractor and the other member to the driven mechanism of the implement. It is to be understood that the tractor and implement are connected to each other by a pivotal draft coupling (not shown) and that the flexible shaft is so arranged as to bend about the center of this pivotal coupling. However, the flexible shaft may be used for any other purpose where it is necessary to transmit torque between drive and driven members which are angularly movable with respect to each other.

What I claim as my invention is:

1. A flexible shaft comprising a flexible tube and a series of torque transmitting elements therein, each element including a spherical portion fitting the inner diameter of said tube and having a slot in one hemisphere thereof and a transversely extending trunnion connected to the other hemisphere by a neck portion, the central plane of said slot being perpendicular to the axis of the trunnion and the diameter of the trunnion being the same as the width of the slot and engaging the slot of the next adjacent element.

2. A flexible shaft comprising a flexible tube and a series of torque transmitting elements therein, each element including a spherical portion fitting the inner diameter of said tube and having a slot in one hemisphere thereof and a transversely extending trunnion connected to the other hemisphere by a neck portion, the central plane of said slot being perpendicular to the axis of the trunnion and the diameter of the trunnion being the same as the width of the slot and engaging the slot of the next adjacent element and a knob in axial alignment with said neck portion projecting beyond said trunnion to contact with the end surface of said slot.

3. A flexible shaft comprising a flexible tube and a series of torque transmitting elements therein, each element including a spherical portion fitting the inner diameter of said tube and having a slot in one hemisphere thereof and a transversely extending trunnion connected to the other hemisphere by a neck portion, the central plane of said slot being perpendicular to the axis of the trunnion and the diameter of the trunnion being the same as the width of the slot and engaging the slot of the next adjacent element and a knob in axial alignment with said neck portion projecting beyond said trunnion to contact with the end surface of said slot, the diameter of said neck portion being slightly less than the diameter of said trunnion.

4. A flexible shaft comprising a flexible tube and a series of torque transmitting elements therein, each element including a spherical portion fitting the inner diameter of said tube and having a slot in one hemisphere thereof and a transversely extending trunnion connected to the other hemisphere by a neck portion, the central plane of said slot being perpendicular to the axis of the trunnion and the diameter of the trunnion being the same as the width of the slot and engaging the slot of the next adjacent element and a knob in axial alignment with said neck portion projecting beyond said trunnion to contact with the end surface of said slot, the diameter of said neck portion being slightly less than the diameter of said trunnion and the bottom surface of said slot being concave in the portion engaged by said knob.

5. A flexible shaft comprising a flexible tube and a series of torque transmitting elements therein, each element including a spherical portion fitting the inner diameter of said tube and having a slot in one hemisphere thereof, a trunnion connected to the other hemisphere having its axis extending perpendicular to the central plane of said slot and being of a diameter equal to the width of the slot to engage the slot of the next adjacent element.

6. In a flexible shaft assembly, an inner assembly comprising a series of torque transmitting elements, each having a spherical body portion formed with a slot in one end and having a neck portion projecting from the other, the latter having a transversely extending cylindrical trunnion at the end of said neck portion, the central plane of said slot being perpendicular to the axis of the trunnion, and the diameter of the trunnion being substantially the same as the width of the slot and disposed within the slot of the next adjacent element.

7. In a flexible shaft assembly, an inner assembly comprising a series of torque transmitting elements, each having a spherical body portion formed with a slot in one end and having a neck portion projecting from the other, the latter having a transversely extending cylindrical trunnion at the end of said neck portion, the central plane of said slot being perpendicular to the axis of the trunnion, and the diameter of the trunnion being substantially the same as the width of the slot and disposed within the slot of the next adjacent element, the trunnion being spaced from the inner end of such slot.

8. In a flexible shaft assembly, an inner assembly comprising a series of torque transmitting elements, each having a spherical body portion formed with a slot in one end and having a neck portion projecting from the other, the latter having a transversely extending cylindrical trunnion at the end of said neck portion, the central plane of said slot being perpendicular to the axis of the trunnion, and the diameter of the trunnion being substantially the same as the width of the slot and disposed within the slot of the next adjacent element, the thickness of the neck portion being less than the diameter of the trunnion.

9. In a flexible shaft assembly, an inner assembly comprising a series of torque transmitting elements, each having a spherical body portion formed with a slot in one end and having a neck portion projecting from the other, the latter having a transversely extending cylindrical trunnion at the end of said neck portion, the central plane of said slot being perpendicular to the axis of the trunnion, and the diameter of the trunnion being substantially the same as the width of the slot and disposed within the slot of the next adjacent element, the trunnion being spaced from the inner end of such slot, the thickness of the neck portion being less than the diameter of the trunnion

FREDERICK B. FITCH.

REFERENCES CITED

The following references are of record in the file of this patent:

UNITED STATES PATENTS

| Number | Name | Date |
| --- | --- | --- |
| 897,349 | Coates | Sep. 1, 1908 |
| 1,866,714 | King | July 12, 1932 |

FOREIGN PATENTS

| Number | Country | Date |
| --- | --- | --- |
| 19,017 | Great Britain | 1900 |